Patented May 19, 1936

2,040,913

UNITED STATES PATENT OFFICE 2,040,913

PROCESS FOR PRODUCING A TOLYL CARBINOL

William J. Amend, Wilmington, Del., assignor to E. I. du Pont de Nemours & Company, Wilmington, Del., a corporation of Delaware No Drawing. Application June 29, 1934, Serial No. 733,124

19 Claims. (Cl. 260—153)

This invention relates to processes for the catalytic hydrogenation of toluic aldehydes to the corresponding tolyl carbinols.

The hydrogenation of aldehydes as a class is not new, and there are numerous disclosures covering the use of many types of catalysts. For example, the hydrogenation of benzaldehyde under conditions similar to those of the present invention has been thoroughly disclosed. Likewise numerous aldehydes of both the aliphatic and aromatic series have been hydrogenated with platinum catalysts. It has now been discovered that toluic aldehyde may be catalytically hydrogenated to the corresponding tolyl carbinols, especially when using a base metal catalyst.

It is an object of this invention to produce tolyl carbinols from toluic aldehydes by means of catalytic hydrogenation. It is a further object of the invention to carry out these reactions at relatively low temperatures and at pressures above atmospheric in the presence of highly efficient base metal catalysts.

Investigation of the existing processes for the hydrogenation of aldehydes has led to the discovery that the hydrogenation of toluic aldehydes to tolyl carbinols may be accomplished successfully in the presence of base metal catalysts at relatively low temperatures and elevated pressures. The following examples set forth preferred embodiments of the invention.

Example I

A charge consisting of 200 g. of p-toluic aldehyde and 20 g. of reduced nickel-on-kieselguhr catalyst was placed in a shaking autoclave and agitated for three hours at 80–100° C. and 2,000 lbs. per sq. in. hydrogen pressure. The reaction products were taken up in ether and the catalyst removed by filtration. The ether was evaporated and 300 g. of benzene added to the reaction mixture. One hundred two grams of pure para-tolyl carbinol crystals were obtained by crystallization from the benzene solution, and in addition, 74 g. of crude crystals. The melting point of the p-tolyl carbinol was 58.5° to 59.5° C.

Example II

An autoclave equipped for agitation was charged with 200 g. of p-toluic aldehyde and 20 g. of copper carbonate-on-kieselguhr catalyst. Agitation was maintained for 1.5 hours at a temperature of 135° C. to 150° C. and a hydrogen pressure of 2,000 lbs. per sq. in. The reaction products were dissolved in ethyl alcohol and the catalyst removed by filtration. The crystals of p-tolyl carbinol recovered by crystallization amounted to 133 g. or 66% of theory.

Example III

Two hundred grams of p-toluic aldehyde and 15 g. of nickel catalyst prepared by digesting a finely powdered 50% nickel-aluminum alloy with sodium hydroxide were agitated in an autoclave for 4 hours at a temperature of 45° to 60° C. and a hydrogen pressure of 1,400 to 2,100 lbs. per sq. in. Separation of the reaction products as described in Example II gave a yield of 128 g. of p-tolyl carbinol which was 64% of theory.

Example IV

A solution of 3,545 g. of p-toluic aldehyde in 500 g. of 95% ethyl alcohol together with 290 g. of copper chromite-on-kieselguhr catalyst was charged into an autoclave and agitated for 2.5 hours at a temperature of 130° C. to 150° C. and a hydrogen pressure of 1,200 to 2,200 lbs. per sq. in. The catalyst was removed by filtration and there was obtained by crystallization, 2,404 g. (68%) of p-tolyl carbinol crystals.

Example V

A charge consisting of 150 g. of p-toluic aldehyde dissolved in 50 g. of water, and 12 g. of nickel catalyst prepared by digesting a finely powdered 50% nickel-aluminum alloy with sodium hydroxide was agitated in an autoclave for 1.7 hours at a temperature of 45° to 55° C. and a hydrogen pressure of 1,200 to 2,200 lbs. per sq. in. From the reaction products, there was obtained 93 g. (62%) of p-tolyl carbinol crystals.

Ortho-toluic aldehyde may be used in place of p-toluic aldehyde under the conditions of this example to obtain o-tolyl carbinol.

Example VI

Two hundred grams of dihydro-p-toluic aldehyde dissolved in 100 g. of ethyl alcohol, and 10 g. of nickel catalyst prepared by digesting a finely powdered 50% nickel-aluminum alloy with sodium hydroxide was charged into an autoclave and agitated for 4.5 hours at a temperature of 55° C. to 70° C. and a hydrogen pressure of 1,000 to 2,000 lbs. per sq. in. On separating the reaction products there was obtained 50 g. of p-tolyl carbinol and 100 g. of hexahydro-p-tolyl carbinol.

The processes of the present invention are applicable to ortho-, meta-, and para-toluic aldehydes for the production of the corresponding tolyl carbinols.

A wide range of catalysts is suitable for effecting the hydrogenation of toluic aldehydes. Base metal hydrogenating catalysts may be used such as, iron, copper, nickel, cobalt, silver, tin, etc. The base metal catalyst may be used in the elementary state or in the oxide form, and may be promoted by difficultly reducible oxides of metals such as chromium, vanadium, molybdenum, etc. For example, a preferred catalyst is copper, combined with chromium oxide in a form commonly termed copper chromite. When using metal catalysts, it is preferable that they be supported on inert materials such as kieselguhr, pumice, silica gel, etc. A preferred nickel catalyst is prepared by digesting a nickel-aluminum alloy with sodium hydroxide according to the Raney method as described in U. S. Patent 1,628,190. Another preferred catalyst consists of freshly reduced nickel supported on kieselguhr and which has been protected after reduction from undue exposure to the air.

Temperature is an important factor in the success of the processes of this invention. Operable temperatures range from 25° C. to 200° C. However, the optimum temperature for a given hydrogenation will depend upon the catalyst employed. For example, when employing a nickel catalyst the preferred temperature range is between 40° C. and 80° C., whereas copper catalysts such as copper chromite or copper carbonate are most efficient in the temperature range of 125° C. to 175° C.

Pressures above atmospheric are required for the processes herein described. Pressures in the range of 1,000 to 3,000 lbs. per sq. in. are preferred, but a wider range of pressure may be employed, say from 25 lbs. per sq. in. to an upper limit determined only by the strength of the reaction vessel.

As indicated in the examples, the toluic aldehydes may be hydrogenated alone or in the presence of solvents such as water, alcohol, hydrocarbons, esters, etc.

The processes of the present invention provide a new, practical, and economical method for obtaining tolyl carbinols from toluic aldehydes. The products are possessed of pleasant odors and may be employed in the manufacture of compounds used as perfumes.

As many apparently and widely different embodiments of this invention may be made without departing from the spirit and scope thereof, it is to be understood that I do not limit myself to the specific embodiments thereof except as defined in the appended claims.

I claim:

1. A process of hydrogenating a toluic aldehyde having the aldehyde radical directly attached to the ring which comprises contacting said toluic aldehyde and hydrogen in the presence of a catalyst at a temperature of about 25° C. to 200° C. and at a superatmospheric pressure.

2. A process of hydrogenating a toluic aldehyde having the aldehyde radical directly attached to the ring to form a corresponding tolyl carbinol which comprises contacting said toluic aldehyde and hydrogen in the presence of a hydrogenation catalyst at a temperature of about 25° C. to 200° C. and at a superatmospheric pressure.

3. A process of hydrogenating a toluic aldehyde having the aldehyde radical directly attached to the ring to form a corresponding tolyl carbinol which comprises contacting said toluic aldehyde and hydrogen in the presence of a base metal hydrogenation catalyst at a temperature of about 25° C. to 200° C. and at a superatmospheric pressure.

4. A process of hydrogenating a toluic aldehyde having the aldehyde radical directly attached to the ring to form a corresponding tolyl carbinol which comprises contacting said toluic aldehyde and hydrogen in the presence of a catalyst comprising copper chromite at a temperature of about 25° C. to 200° C. and at a superatmospheric pressure.

5. A process of hydrogenating a toluic aldehyde having the aldehyde radical directly attached to the ring to form a corresponding tolyl carbinol which comprises contacting said toluic aldehyde and hydrogen in the presence of a hydrogenation catalyst at a temperature of 25° C. to 200° C. and at a superatmospheric pressure.

6. A process of hydrogenating a toluic aldehyde having the aldehyde radical directly attached to the ring to form a corresponding tolyl carbinol which comprises contacting said toluic aldehyde and hydrogen in the presence of a nickel catalyst at a temperature of 40° C. to 80° C. and at a superatmospheric pressure.

7. A process of hydrogenating a toluic aldehyde having the aldehyde radical directly attached to the ring to form a corresponding tolyl carbinol which comprises contacting said toluic aldehyde and hydrogen in the presence of a copper containing catalyst at a temperature of 125° C. to 175° C. and at a superatmospheric pressure.

8. A process of hydrogenating a toluic aldehyde having the aldehyde radical directly attached to the ring to form a corresponding tolyl carbinol which comprises contacting said toluic aldehyde and hydrogen in the presence of a hydrogenation catalyst at a temperature of about 25° C. to 200° C. and under a hydrogen pressure in excess of 25 lbs. per square inch.

9. A process of hydrogenating a toluic aldehyde having the aldehyde radical directly attached to the ring to form a corresponding tolyl carbinol which comprises contacting said toluic aldehyde and hydrogen in the presence of a hydrogenation catalyst at a temperature of about 25° C. to 200° C. and under pressure of 1000 to 3000 lbs. per square inch.

10. A process of hydrogenating a toluic aldehyde having the aldehyde radical directly attached to the ring to form a corresponding tolyl carbinol which comprises contacting said toluic aldehyde and hydrogen in the presence of a hydrogenation catalyst at a temperature of about 25° C. to 200° C. and at a superatmospheric pressure, and until the hydrogen is no longer absorbed.

11. A process of hydrogenating a toluic aldehyde having the aldehyde radical directly attached to the ring to form the corresponding tolyl carbinol, which comprises contacting said toluic aldehyde and hydrogen at a temperature of from 25 to 200° C. and at superatmospheric pressure in the presence of a hydrogenation catalyst and an inert solvent.

12. A process of hydrogenating p-toluic aldehyde to form p-tolyl carbinol which comprises contacting p-toluic aldehyde and hydrogen in the presence of a base metal hydrogenation catalyst at a temperature from about 25° C. to 200° C. and at a superatmospheric pressure.

13. A process of hydrogenating p-toluic aldehyde to form p-tolyl carbinol which comprises contacting p-toluic aldehyde and hydrogen in the presence of a catalyst comprising copper chromite at a temperature from about 25° C. to 200° C. and at a superatmospheric pressure.

14. A process of hydrogenating p-toluic aldehyde to form p-tolyl carbinol which comprises contacting p-toluic aldehyde and hydrogen in the presence of a hydrogenation catalyst at a temperature of 25° C. to 200° C. and at a superatmospheric pressure.

15. A process of hydrogenating p-toluic aldehyde to form p-tolyl carbinol which comprises contacting p-toluic aldehyde and hydrogen in the presence of a nickel catalyst at a temperature of 40° C. to 80° C. and at a superatmospheric pressure.

16. A process of hydrogenating p-toluic aldehyde to form p-tolyl carbinol which comprises contacting p-toluic aldehyde and hydrogen in the presence of a copper containing catalyst at a temperature of 125° C. to 175° C. and at a superatmospheric pressure.

17. A process of hydrogenating p-toluic aldehyde to form p-tolyl carbinol which comprises contacting p-toluic aldehyde and hydrogen in the presence of a base metal hydrogenating catalyst at a temperature of about 25° C. to 200° C. and under a hydrogen pressure in excess of 25 pounds per square inch.

18. A process of hydrogenating p-toluic aldehyde to form p-tolyl carbinol which comprises contacting p-toluic aldehyde and hydrogen in the presence of a base metal hydrogenating catalyst at a temperature of about 25° C. to 200° C. and under pressure of 1000 to 3000 pounds per square inch.

19. A process of hydrogenating p-toluic aldehyde which comprises agitating and heating a mixture consisting of p-toluic aldehyde in ethyl alcohol and hydrogen while in contact with a catalyst consisting of copper chromite-on-kieselguhr, maintaining the reactants at a temperature of 130° C. to 150° C. and at a hydrogen pressure of 1200 to 2200 lbs. per square inch for two and one-half hours.

WILLIAM J. AMEND.